US010556570B2

(12) United States Patent
Mitsumori et al.

(10) Patent No.: US 10,556,570 B2
(45) Date of Patent: Feb. 11, 2020

(54) BEARING DEVICE

(71) Applicants: DENSO WIPER SYSTEMS, INC., Kosai, Shizuoka (JP); Taiyo Stainless Spring Co., Ltd., Nerima-ku, Tokyo (JP)

(72) Inventors: Kazuto Mitsumori, Kosai (JP); Tomonori Iso, Kosai (JP)

(73) Assignees: DENSO WIPER SYSTEMS, INC., Shizuoka (JP); TAIYO STAINLESS SPRING CO., LTD., Tokyo (JP)

( * ) Notice: Subject to any disclaimer, the term of this patent is extended or adjusted under 35 U.S.C. 154(b) by 99 days.

(21) Appl. No.: 15/567,865

(22) PCT Filed: Mar. 11, 2016

(86) PCT No.: PCT/JP2016/057704
§ 371 (c)(1),
(2) Date: Oct. 19, 2017

(87) PCT Pub. No.: WO2016/170868
PCT Pub. Date: Oct. 27, 2016

(65) Prior Publication Data
US 2018/0105141 A1 Apr. 19, 2018

(30) Foreign Application Priority Data
Apr. 20, 2015 (JP) ................. 2015-085757

(51) Int. Cl.
*B60S 1/34* (2006.01)
(52) U.S. Cl.
CPC .......... *B60S 1/3447* (2013.01); *B60S 1/3404* (2013.01); *B60S 1/3431* (2013.01)
(58) Field of Classification Search
CPC .... B60S 1/3431; B60S 1/3447; B60S 1/3438; B60S 1/34
See application file for complete search history.

(56) References Cited

U.S. PATENT DOCUMENTS 4,788,736 A * 12/1988 Arai ...................... B60S 1/3801
15/250.32
4,932,097 A * 6/1990 Kobayashi ................ B60S 1/34
15/250.34
(Continued)

FOREIGN PATENT DOCUMENTS

JP 60-182519 U 12/1985
JP 63-199865 U 12/1988
(Continued)

OTHER PUBLICATIONS

International Search Report, and English language translation thereof, in corresponding International Application No. PCT/JP2016/057704, dated Jun. 14, 2016, 5 pages.

*Primary Examiner* — Michael D Jennings
(74) *Attorney, Agent, or Firm* — Brinks Gilson & Lione

(57) ABSTRACT

Provided is a bearing device capable of suppressing corrosion for a long time. The bearing device is for use in a wiper arm to pivotably attach a retainer to an arm head. The bearing device includes an outer bushing press-fitted into a hinge portion of the arm head, an inner bushing rotatably inserted into a bore in the outer bushing, and a rivet inserted into a bore in the inner bushing to secure the retainer and the inner bushing together integrally. Thus, a hinge portion of the retainer, the inner bushing, and the rivet are pivotable relative to the hinge portion of the arm head and the outer bushing. The outer bushing has an inside bushing part and an outside bushing part provided around the outer periphery of the inside bushing part and joined to the inside bushing part. The joint surface of the inside bushing part and the joint surface of the outside bushing part are joined to each other by interatomic bonding. The outside bushing part is formed of the same material as that of the arm head.

3 Claims, 3 Drawing Sheets

(56) References Cited

U.S. PATENT DOCUMENTS

| | | | |
|---|---|---|---|
| 5,271,122 A * | 12/1993 | Roth | B60S 1/3801 15/250.46 |
| 5,819,361 A * | 10/1998 | Merkel | B60S 1/3801 15/250.46 |
| 6,393,654 B2 * | 5/2002 | Nacamuli | B60S 1/3801 15/250.44 |
| 2010/0215296 A1 | 8/2010 | Dahlman | |
| 2012/0230756 A1 * | 9/2012 | Shido | B60S 1/345 403/161 |

FOREIGN PATENT DOCUMENTS

| | | | |
|---|---|---|---|
| JP | 2010-529371 A | 8/2010 | |
| JP | 2012-197072 A | 10/2012 | |
| JP | 2012-218588 A | 11/2012 | |
| JP | 2014-117958 A | 6/2014 | |

* cited by examiner

BEARING DEVICE

This application is a 371 application of PCT/JP2016/057704 having an international filing date of Mar. 11, 2016, which claims priority to JP2015-085757 filed Apr. 20, 2015, the entire contents of which are incorporated herein by reference.

TECHNICAL FIELD

The present invention relates to bearing devices. More particularly, the present invention relates to a bearing device for use in a wiper arm to pivotably attach a retainer to an arm head, and also relates to a wiper arm having the bearing device.

BACKGROUND ART

Generally, a wiper arm includes an arm head secured to a vehicle, a retainer capable of retaining a blade for wiping a windshield, and a bearing device for pivotably attaching the retainer to the arm head. The arm head has a bolt receiving hole provided at one end thereof so that the arm head can be secured to the vehicle body with a bolt inserted through the bolt receiving hole. The arm head further has a hinge portion at the other end thereof, which is opposite to the one end.

The bearing device includes an outer bushing press-fitted into the hinge portion of the arm head, an inner bushing rotatably inserted into a bore in the outer bushing, and a rivet inserted into a bore in the inner bushing to secure the retainer and the inner bushing together integrally. Thus, a hinge portion of the retainer, the inner bushing, and the rivet are pivotable relative to the hinge portion of the arm head and the outer bushing.

The arm head is, generally, formed of aluminum with a view to achieving a weight reduction. On the other hand, the outer bushing, which is press-fitted into the hinge portion of the arm head, needs to have mechanical strength sufficient for supporting the retainer, the inner bushing, and the rivet. To ensure such strong mechanical strength, the outer bushing is, generally, formed of stainless steel.

CITATION LIST

Patent Literature

PTL 1: Japanese Patent Application Laid-Open Publication No. 2012-218588

SUMMARY OF INVENTION

Technical Problem

When the above-described bearing device is employed in a wiper for a vehicle and used for a long time, corrosion may occur on the arm head, which is made of aluminum. In the present circumstances, however, the cause of corrosion is not known; therefore, not only the corroded arm head but all the component parts unavoidably need to be replaced with new ones.

The present invention has been made in view of the above-described problem, and an object of the present invention is to provide a bearing device capable of suppressing corrosion for a long time.

Solution to Problem

In the present state of the art, an outer bushing to be press-fitted into a hinge portion of an arm head of a wiper arm is formed by rolling up a stainless steel sheet into a round shape by forming process to form an outer bushing body and coating the inner side of the outer bushing body with Teflon (registered trademark). The outer bushing formed in this way is press-fitted into a hinge portion of an arm head made of die-cast aluminum. The bearing part of the arm hinge has a structure in which the outer bushing and the inner bushing rotate relative to each other through contact between the inner side of the outer bushing and the outer side of the inner bushing. Thus, according to the current specifications, the arm head is made of die-cast aluminum, and the outer bushing is made of stainless steel.

The present inventors conducted exhaust studies, and as a result, found out the cause of corrosion of the aluminum arm head. We found that a scratch may be made in the outermost region of the bore in the hinge portion of the aluminum arm head when the stainless steel outer bushing is driven into the bore in the arm head hinge portion in order to press-fit the former into the latter. It may be considered that the hinge portion of the arm head is scratched because the aluminum arm head hinge portion is weaker in mechanical strength than stainless steel. We also found that the scratch is present in the anodized aluminum layer of the bore in the hinge portion. Further, we found that there is a possibility of salt water entering the scratch, and if this occurs, corrosion occurs due to the electric potential difference established across the press-fit interface by contact between the different kinds of materials, i.e. the aluminum arm head and the stainless steel outer bushing. That is, corrosion occurs on the aluminum arm head, which is lower in electric potential than the stainless steel outer bushing.

As a measure to improve corrosion resistance, it is conceivable to form the outer bushing by using the same material as that of the arm head, i.e. aluminum, to thereby eliminate the electric potential difference between the outer bushing and the arm head. With this measure, however, the outer bushing cannot function as an arm hinge because of reduction in mechanical strength.

Therefore, in the present invention, the material used to constitute the outer bushing has been changed to a clad material of stainless steel and aluminum to ensure both corrosion resistance and mechanical strength. That is, the outer bushing has an outside layer part and an inside layer part. The outside layer part is made of aluminum, and the inside layer part is made of stainless steel. Further, the bore side surface of the inside layer part, which is made of stainless steel, is preferably coated with Teflon (registered trademark).

The clad material of the outer bushing, per se, has no danger of entry of salt water and is free from corrosion because aluminum constituting the outside layer part and stainless steel constituting the inside layer part are joined to each other by interatomic bonding.

To solve the above-described problem, the present invention provides a bearing device for pivotably attaching a second member to a first member. The bearing device includes an outer bushing press-fitted into a hinge portion of the first member, an inner bushing rotatably inserted into a bore in the outer bushing, and a rivet inserted into a bore in the inner bushing to secure the second member and the inner bushing together integrally. Thus, a hinge portion of the second member, the inner bushing, and the rivet are pivotable relative to the hinge portion of the first member and the outer bushing. The outer bushing has an inside bushing part and an outside bushing part provided around the outer periphery of the inside bushing part and joined to the inside bushing part. A joint surface of the inside bushing part and a joint surface of the outside bushing part are joined to each other by interatomic bonding, and the outside bushing part is formed of the same material as that of the first member.

In the above-described bearing device, the outside bushing part and the first member may be made of aluminum.

In the above-described bearing device, the inside bushing part may be made of stainless steel.

Advantageous Effects of Invention

According to the present invention, the outside layer part of the outer bushing and the arm head are made of the same material, e.g. aluminum, and have no electric potential difference therebetween. Therefore, even if a scratch is made in the arm head and salt water enters the scratch, the arm head can be prevented from corrosion.

DETAILED DESCRIPTION OF THE PREFERRED EMBODIMENTS

Figure 1:
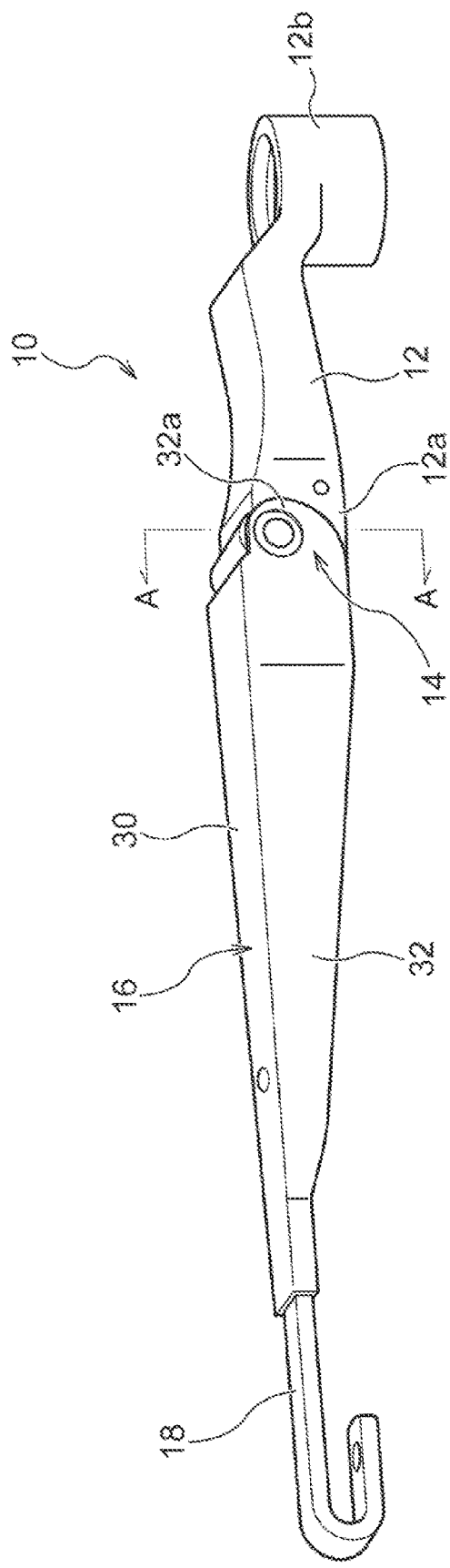
FIG. 1 is a perspective view of a wiper arm according to one embodiment of the present invention.

A bearing device according to one embodiment of the present invention will be explained below on the basis of FIGS. 1 to 4, with regard to an example in which the bearing device is applied to a wiper arm.

A wiper arm 10 includes an arm head 12 linked to a drive motor (not shown), a retainer 16 pivotably or rotatably connected to the arm head 12 through a bearing device 14, and an arm piece 18 secured to the retainer 16. The arm head 12 and the retainer 16 are connected to each other by a spring (not shown).

In use of the wiper arm 10, the retainer 16 is urged to rotate downward as seen in FIG. 1 by the spring (not shown). Consequently, a wiper blade (not shown) held by the arm piece 18 is pressed against a to-be-wiped surface (e.g. a windshield surface of an automobile) with an appropriate pressing force. In normal use of the wiper arm 10, the retainer 16 assumes a position in which the retainer 16 is aligned with the arm head 12 in a substantially straight line. If necessary, however, the retainer 16 can be rotated upward to assume an erect position in which the retainer 16 is disposed at an angle to the arm head 12.

It should be noted that the arm head 12 is preferably subjected to aluminum anodizing treatment to provide corrosion resistance.

The bearing device 14 is provided between the arm head 12 as a first member and the retainer 16 as a second member. The bearing device 14 allows the retainer 16 to be pivotably attached to the arm head 12.

The bearing device 14 includes a cylindrical outer bushing 20 press-fitted into a bore 12b formed in a hinge portion 12a of the arm head 12, an inner bushing 22 rotatably inserted into a bore 20a in the outer bushing 20, and a rivet 24 inserted into a bore 22a in the inner bushing 22 to secure the retainer 16 and the inner bushing 22 together integrally.

The arm head 12 is formed in a continuous form and has one end portion 12b and another end portion 12a. The one end portion 12b constitutes a mount portion to be rotatably attached to the body of an automobile near the windshield surface. The other end portion of the arm head 12 constitutes a hinge portion 12b to which the retainer 16 is pivotably attached.

The hinge portion 12a of the arm head 12 is formed therein with a through-bore 12c extending to intersect the longitudinal direction of the arm head. Into the through-bore 12c is press-fitted a cylindrical outer bushing 20 formed of a clad material and having a through-bore 20a. The outer bushing 20 is disposed so that the through-bore 20a is in coaxial relation to the through-bore 12c in the hinge portion 12a of the arm head 12.

The through-bore 20a in the outer bushing 20 has the inner bushing 22 inserted therein rotatably. A surface of the outer bushing 20 that defines the through-bore 20a is coated with Teflon (registered trademark) so as to be highly durable to withstand relative rotary motion between the outer bushing 20 and the inner bushing 22. The inner bushing 22 is formed in a cylindrical shape in the same way as the outer bushing 20 and made by carburizing an SWRCH (Steel Wire Rod Cold Heading) material and plating the carburized material with nickel.

The retainer 16 has a top portion 30 and sidewall portions 32 extending from the laterally opposite ends, respectively, of the top portion. The retainer 16 has a hinge portion 32a at an end thereof closer to the arm head 12. The sidewall portions 32 of the retainer have holes 32b formed in the hinge portion 32a at respective positions facing the through-bore 12c in the arm head 12.

The inner bushing 22 has a rivet 24 inserted in the through-bore 22a. The rivet 24 has a rod-shaped rivet body 24a and staked (or crimped) portions 24b formed at both ends of the rivet body 24a. The rivet 24 extends through the holes 32b formed in the sidewall portions 32 of the retainer 16 and through the through-bore 22a in the inner bushing 22. The rivet 24 is configured to have a length longer than the longitudinal length of the inner bushing 22 and longer than the lateral length of the arm head 12 and also longer than the lateral length of the retainer 16. Accordingly, the rivet 24 projects from the respective the inner bushing 22, the hinge portion 12a of the arm head 12, and lateral sidewall portions of the hinge portion 32a of the retainer 16. The portions of the rivet 24 that project from the lateral sidewall portions of the hinge portion 32a of the retainer are staked or crimped to form staked portions 24b. The staked portions 24b allow the rivet 24 and the retainer 16 to be connected together and also allow the inner bushing 22, the rivet 24, and the retainer 16 to be joined together integrally. Further, the rivet 24 is inserted in the through-bore in the inner bushing 22, as has been stated above. With this structure, the rivet 24, the inner bushing 22, and the retainer 16 can pivot together integrally relative to the outer bushing 20 and the arm head 12.

The outer bushing 20 has a length somewhat longer than the lateral length of the arm head 12, i.e. than the distance between the lateral sides of the hinge portion 12a of the arm head 12, so that the outer bushing 20 projects outward from the lateral sides of the hinge portion of the arm head. The opposing ends of the outer bushing 20, which project outward from the lateral sides of the hinge portion 12a of the arm head 12, abut against the inner wall surfaces of the lateral sides of the hinge portion 32a of the retainer 16.

Figure 2:
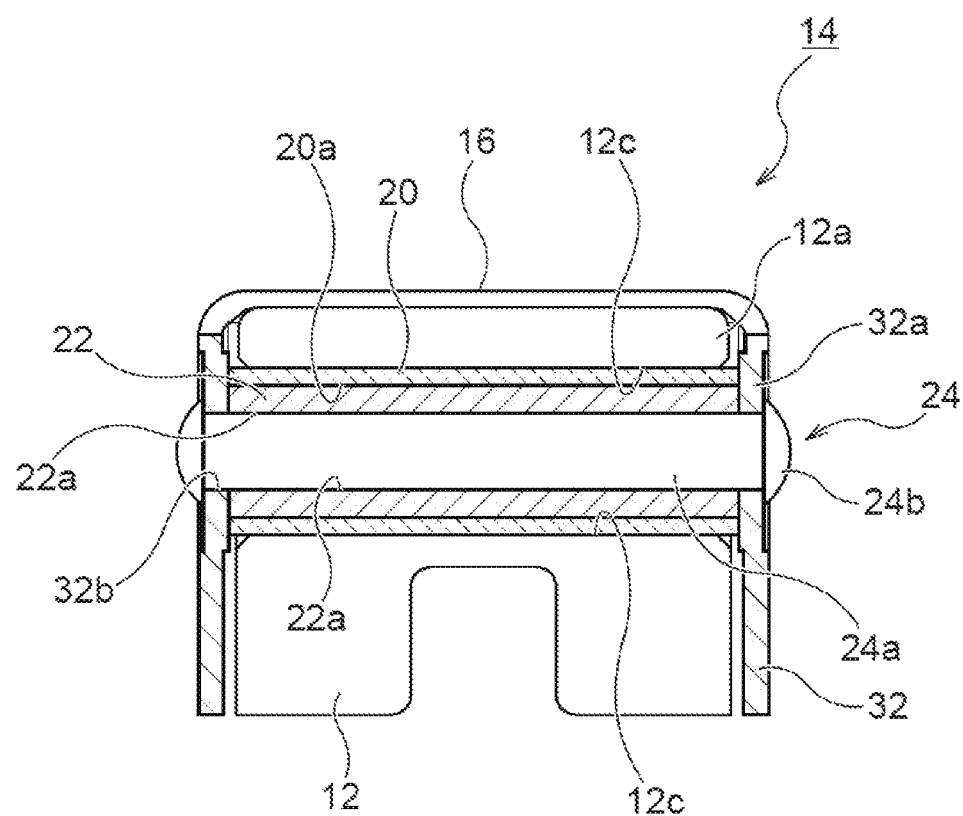
FIG. 2 is a sectional view of a bearing device of the wiper arm, which is taken along the line A-A in FIG. 1.
Figure 3:
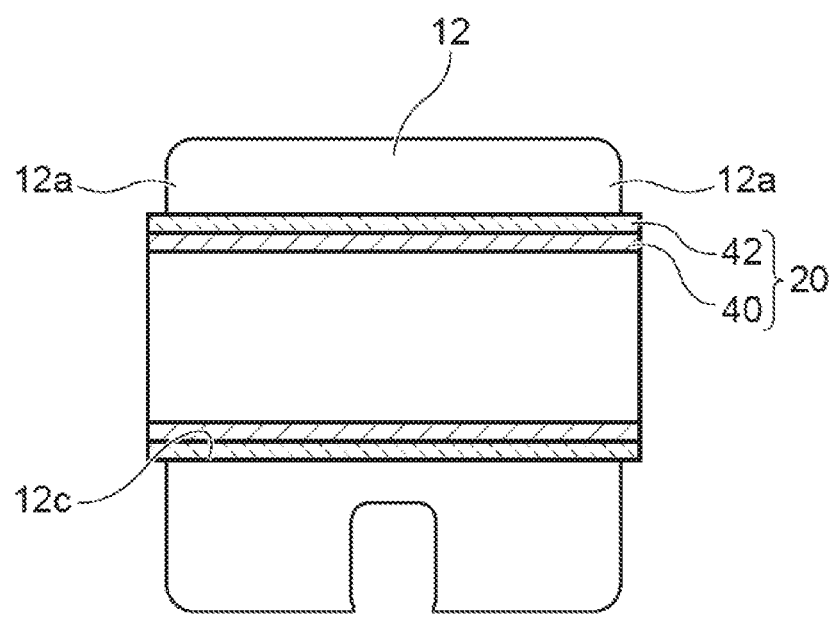
FIG. 3 is a schematic view schematically showing an arm head and an outer bushing of the bearing device shown in FIG. 2.
Figure 4:
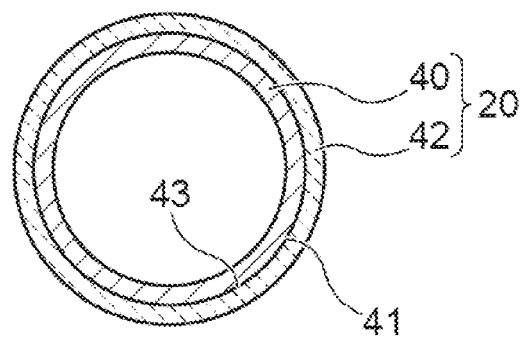
FIG. 4 is a schematic plan view of the outer bushing.

The outer bushing 20 has, as shown in FIGS. 3 and 4, an inside bushing part 40 made of stainless steel, and an outside bushing part 42 made of aluminum, which is provided around the outer periphery of the inside bushing part and joined to the inside bushing part. The joint surface of the inside bushing part and the joint surface of the outside bushing part are joined to each other by interatomic bonding. In FIG. 2, the outer bushing 20 is schematically shown with a view to facilitating the understanding of the structure of the bearing device 14.

The outer bushing 20 comprises a clad material (also known as a hybrid material), as has been stated above. The outer bushing 20 is formed by joining together a surface of one metal (stainless steel in this embodiment) and a surface of another metal (aluminum as a different kind of metal in the present invention) by roll-bonding under pressure. The outer bushing 20 is formed by a method of producing a clad material, i.e. a producing method comprising:

(1) a cleaning step in which joint surfaces of one material and another material are cleaned to remove dirt, dust, oxides, etc. therefrom, and the cleaned surfaces are roughened to make the surfaces easily bondable to each other;

(2) a roll-bonding step in which the two materials, i.e. stainless steel sheet and aluminum sheet, are surface-joined to each other under pressure (i.e. the two materials are joined together in such a manner as to enter each other's regions by interatomic bonding);

(3) a heat-treating step in which the interatomic bonding is strengthened by heat treatment; and (4) a rolling step in which the resulting material is rolled out into a thin sheet having a required thickness.

In this way, the joint surface 41 of the inside bushing part 40 made of stainless steel and the joint surface 43 of the outside bushing part 42 made of aluminum, which is provided around the outer periphery of the inside bushing part, are roll-bonded under pressure and thus joined to each other by interatomic bonding. The joint surfaces 41 and 43 are completely firmly bonded together by heat treatment, thus achieving an increase in bonding strength, as has been stated above. Consequently, the atoms of the mating materials at the joint interface are inter-diffused into each other's regions by heat treatment, thereby achieving firm bonding. There is therefore no possibility of salt water entering between the bonded surfaces, and there is no fear of corrosion.

The outside bushing part 42 is made of the same material as that of the arm head 12, e.g. aluminum. Thus, the outside bushing part 42 and the arm head 12 can be made of material having the same mechanical strength or rigidity; therefore, the outer bushing or the arm head is less likely to be scratched than in the conventional device when the former is press-fitted into the latter. Even if either the outside bushing part 40 or the arm head 12 is scratched and salt water enters the scratch, because the outside bushing part 40 and the arm head 12 are made of the same material, e.g. aluminum, there is no possibility of occurrence of an electric potential difference as experienced in the conventional device. Accordingly, corrosion can be suppressed or prevented.

Although the above-described embodiment shows an example in which the bearing device according to the present invention is used in a wiper arm, the present invention may also be applied to bearing devices other than those for wiper arms, e.g. general hinge structures such as a structure for pivotally attaching a door to a main body, a window opening-closing structure, etc.

Further, the application of the wiper arm bearing device is not limited to automobile wiper arms but may also be used in wiper arms of other moving bodies such as railway vehicles, aircraft, marine structures, etc.

Although in the above-described embodiment the present invention has been described in detail with regard to an example in which aluminum and stainless steel are used as constituent materials, the present invention is not limited thereto but may be applied to any other metals.

Although only some exemplary embodiments of the present invention have been described above, those skilled in the art will readily appreciate that various changes or improvements can be made to the exemplary embodiments without materially departing from the novel teaching and advantages of the present invention. Accordingly, all such changes or improvements are intended to be included within the scope of the present invention.

The foregoing embodiments may be combined at will.

Although only some exemplary embodiments of the present invention have been described above, those skilled in the art will readily appreciate that various changes or improvements can be made to the exemplary embodiments without materially departing from the novel teaching and advantages of the present invention. Accordingly, all such changes or improvements are intended to be included within the scope of the present invention. The foregoing embodiments may be combined at will.

The present application claims priority to Japanese Patent Application No. 2015-85757 filed on Apr. 20, 2015. The entire disclosure of Japanese Patent Application No. 2015-85757 filed on Apr. 20, 2015 including specification, claims, drawings and summary is incorporated herein by reference in its entirety.

The invention claimed is:

1. A bearing device for use in a wiper arm, the bearing device configured to pivotably attach a retainer of the wiper arm to an arm head of the wiper arm, the bearing device comprising:
   an outer bushing formed in a shape of a cylindrical sleeve extending in an axial direction and immobilized to the arm head;
   an inner bushing formed in a shape of a cylindrical sleeve extending in the axial direction and inserted radially inside the outer bushing for rotation relative to the outer bushing; and
   a rivet inserted radially inside the inner bushing configured to immobilize the inner bushing to the retainer, wherein the inner and outer bushings configured for rotation relative to each other allow relative rotation between the retainer and the arm head,
   wherein the outer bushing comprises an inside bushing part and an outside bushing part both formed in a shape of cylindrical sleeve extending in the axial direction, the outside busing part provided radially outside of the inside bushing part, wherein the inside bushing part and the outside bushing part are joined together through bonding surfaces thereof that are fused together by means of interatomic bonding, and
   the outside bushing part is made of aluminum, and the inside busing part is made of metal other than aluminum.

2. The bearing device of claim 1, wherein the inside bushing part is made of stainless steel.

3. The bearing device of claim 1, wherein the interatomic-bonded bonding surfaces comprise pressure-roll bonded surfaces.

* * * * *